United States Patent [19]

Yasuda et al.

[11] Patent Number: 5,081,206

[45] Date of Patent: Jan. 14, 1992

[54] TRISPHENOL, BISPHENOL AND HALOGENATED BISPHENOL EPOXY RESINS COMPOSITION

[75] Inventors: Kiyomi Yasuda; Terufumi Suzuki, both of Ichihara; Toshimasa Takata, Kuga; Isao Kaneko, Chiyoda, all of Japan

[73] Assignee: Mitsui Petrochemical Industries, Ltd., Tokyo, Japan

[21] Appl. No.: 529,433

[22] Filed: May 29, 1990

[30] Foreign Application Priority Data

| May 29, 1989 | [JP] | Japan | 1-135185 |
| May 29, 1989 | [JP] | Japan | 1-135186 |
| Aug. 24, 1989 | [JP] | Japan | 1-217870 |

[51] Int. Cl.⁵ .............................. C08L 63/02
[52] U.S. Cl. ....................... 525/527; 528/98
[58] Field of Search ............ 525/527; 528/98

[56] References Cited

U.S. PATENT DOCUMENTS

| 4,604,317 | 8/1986 | Berman et al. | 528/102 |
| 4,954,603 | 9/1990 | Takata et al. | 528/102 |

FOREIGN PATENT DOCUMENTS

| 3442375 | 6/1985 | Fed. Rep. of Germany | 525/527 |
| 111618 | 4/1989 | Taiwan . | |
| 113987 | 6/1989 | Taiwan . | |

Primary Examiner—John C. Bleutge
Assistant Examiner—Robert E. L. Sellers, II
Attorney, Agent, or Firm—Sherman and Shalloway

[57] ABSTRACT

A heat-resistant, flame-retardant epoxy resin composition is provided by combining or reacting members selected from a polyfunctional epoxy resin, a bisphenol type epoxy resin, a highly halogenated bisphenol type epoxy resin, a low halogenated bisphenol type epoxy resin, and a halogenated bisphenol. The composition is suitable as a laminate useful for printed circuit boards.

18 Claims, No Drawings

TRISPHENOL, BISPHENOL AND HALOGENATED BISPHENOL EPOXY RESINS COMPOSITION

FIELD OF THE INVENTION

This invention generally relates to novel epoxy resin compositions, and more particularly, to novel heat-resistant, flame-retardant epoxy resin compositions having improved workability obtained by a proper combination of a polyfunctional epoxy resin, a bisphenol epoxy resin, a highly halogenated bisphenol epoxy resin, a low halogenated bisphenol epoxy resin, and a halogenated bisphenol.

BACKGROUND OF THE INVENTION

Halogen-containing bisphenol A epoxy resins having blended therein aromatic polyamines, aliphatic polyamines, polyamide amines, amine adducts, dicyandiamide, acid anhydrides, phenol novolak resins and other curing agents have been used as adhesives, coating compositions, molding compositions, casting compositions and other compositions. It is also well known to dilute such blends with solvents to form varnish and apply the varnish to reinforcements by impregnation or coating. Laminates are molded using the impregnated reinforcements.

As the demand for size reduction and precision in the electric and electronic fields increases in the recent years, more severe requirements of heat resistance are imposed on adhesives, insulating coatings, encapsulants, laminates, and other materials for electronic parts in order to provide reliability during high-temperature service. Unfortunately, adhesives, coatings, encapsulants, laminates, and other materials prepared using commercially available conventional bisphenol A epoxy resins generally have a low heat distortion temperature and low electrical insulation and thus suffer from a loss of reliability.

The materials used in the electric and electronic fields are also required to have high flame retardancy. For example, known flame-retardant epoxy resins used as laminates (e.g., printed circuit boards prepared by laminating glass cloth and epoxy resin) include bisphenol A epoxy resins, typically a linear epoxy resin obtained by reacting a liquid bisphenol A epoxy resin having an epoxy equivalent of about 190 with tetrabromobisphenol A. When this linear epoxy resin is cured with dicyandiamide which is a versatile curing agent often used in laminate molding, for example, there is obtained a cured product (typically having a bromo content of 20 to 22% by weight) having a glass transition temperature Tg as low as 120° to 130° C. The heat resistance of the cured product may be increased by adding a polyfunctional epoxy resin such as an ortho-cresol novolak epoxy resin and a phenol novolak epoxy resin to the above-mentioned epoxy resin blend. However, since the addition of a substantial amount of such a polyfunctional epoxy resin sacrifices flame retardancy and moldability, the amount of polyfunctional epoxy resin must be limited.

In the conventional well-known epoxy resin compositions, heat resistance and flame retardancy behave counter to each other as described above. There is not available an epoxy resin composition which can meet heat resistance and flame retardancy at the same time. In the electronic field where higher performance is always desired, there is a need for an epoxy resin composition having both ehat resistance and flame retardancy so that a cured product thereof may become more reliable at high temperatures.

The above-mentioned blends of polyfunctional epoxy resins such as ortho-cresol novolak epoxy resins and phenol novolak epoxy resins cure into products which have a high modulus of elasticity and poor mechanical properties so that they are hard, brittle and prone to cracking upon heat shocks.

Japanese Patent Application Kokai Nos. 3015/1988 and 264623/1988 disclose a specific trifunctional epoxy resin and an epoxy resin composition obtained by reacting the specific trifunctional epoxy resin with a halogenated bisphenol. The resin and composition have the problem that in order to impart sufficient flame retardancy, the resin and composition are inevitably increased in viscosity. The viscosity can be reduced at the sacrifice of heat resistance.

When laminates are formed from such polyfunctional epoxy resin blends, their high viscosity causes inefficient impregnation, bubble entrainment, and thin spots, resulting in laminates which are electrically less reliable, for example, with respect to electrical insulation. Another requirement for the laminates is water resistance. If laminates are less resistant against water, the laminates tend to develop. quality lowering defects known as "blisters," "peeling," and "measling" during soldering of electric and electronic parts.

SUMMARY OF THE INVENTION

The present invention is a continuation of the inventors' previous discovery that a polyfunctional epoxy resin of a specific structure has improved heat resistance and mechanical properties as disclosed in Japanese Patent Application Kokai No. 3015/1988. We have discovered a heat-resistant, flame-retardant epoxy resin composition which maintains the advantages of the previous epoxy resin, is improved in workability and processability, has sufficient flame retardancy and heat resistance, and experiences little loss of mechanical properties and electrical insulation when used at elevated temperatures so that it is suitable as an insulating coating, encapsulant, and sealant for electronic parts and to form laminates useful as printed circuit boards.

We have discovered that an epoxy resin composition (I) obtained by blending a polyfunctional epoxy resin derived from a specific trisphenol with a highly halogenated bisphenol epoxy resin and a bisphenol epoxy resin has much higher heat resistance than cured products of conventional well-known epoxy resins, and is fully reliable with respect to mechanical and electrical properties.

We have also discovered that an epoxy resin composition (II) obtained by reacting a mixture of a polyfunctional epoxy resin having a specific structure, a bisphenol epoxy resin, and a halogenated bisphenol epoxy resin with a halogenated bisphenol in the presence of a catalyst is working and processing efficient and has improved heat resistance and flame retardancy at the same time.

We have further discovered that an epoxy resin composition (III) obtained by blending a halogen-containing epoxy resin resulting from reaction of a mixture of a specific polyfunctional epoxy resin and a bisphenol epoxy resin with a halogenated bisphenol, with a low halogenated bisphenol epoxy resin, a highly halogenated bisphenol epoxy resin, and/or a bisphenol epoxy resin is working and processing efficient and has improved heat resistance and flame retardancy at the same time.

An object of the present invention is to provide a novel epoxy resin composition which has a low viscosity enough to improve workability and processability and has improved heat resistance and flame retardancy at the same time so that it is suitable for the manufacture of insulating coatings, encapsulants, and molded articles upon curing.

Another object of the present invention is to provide a novel epoxy resin composition which has a low viscosity, which is substantially free of high-molecular weight molecules and amenable to impregnation of reinforcements, e.g., glass cloth, and which cures into products having both heat resistance and flame retardancy, so that it is suitable for the manufacture of laminates which are well reliable with respect to mechanical strength and electrical insulation at high temperatures.

DETAILED DESCRIPTION OF THE INVENTION

According to a first aspect of the present invention, there is provided a heat-resistant, flame-retardant epoxy resin composition (I) comprising (A) a polyfunctional epoxy resin obtained by condensing a trisphenol of general formula [1]:

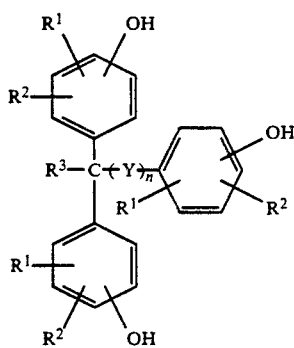

[1]

wherein $R^1$, $R^2$, and $R^3$ are independently selected from the class consisting of a hydrogen atom and an alkyl group having up to 4 carbon atoms, letter n is a number equal to 0 or 1, and Y is a group of general formula [1b] or [1c]:

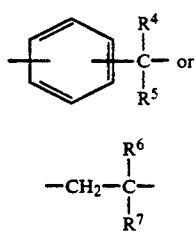

[1b]

[1c]

wherein $R^4$, $R^5$, $R^6$, and $R^7$ are independently selected from the class consisting of a hydrogen atom and an alkyl group having up to 4 carbon atoms, with an epihalohydrin or β-methylepihalohydrin, (B) a bisphenol epoxy resin obtained by condensing a bisphenol with an epihalohydrin or β-methylepihalohydrin, and (D) a high halogenated bisphenol epoxy resin obtained by condensing a halogenated bisphenol with an epihalohydrin or β-methylepihalohydrin.

The trisphenol used herein is represented by general formula (1).

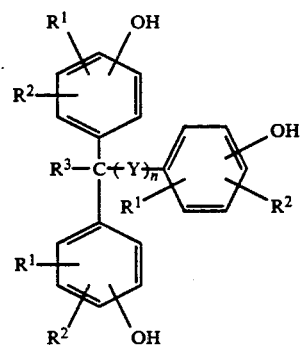

[1]

In formula [1], $R^1$, $R^2$, and $R^3$ are independently selected from the class consisting of a hydrogen atom and an alkyl group having up to 4 carbon atoms, and they may be the same or different. Letter n is a number equal to 0 or 1. In formula [1], Y is a group of general formula [1b] or [1c]:

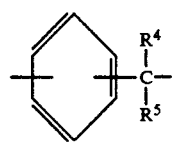

[1b]

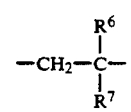

[1c]

In formulae [1b] and [1c], $R^4$, $R^5$, $R^6$, and $R^7$ are independently selected from the class consisting of a hydrogen atom and an alkyl group having up to 4 carbon atoms, and they may be the same or different. Most preferred are trisphenol compounds wherein $R^1$ through $R^7$ are all hydrogen atoms.

Preferred examples of the trisphenol of general formula [1] include 1-[α-methyl-α-(4′-hydroxyphenyl)ethyl]-4-[α′,α′-bis(4″-hydroxyphenyl)ethyl]benzene, 1,1,3-tris(2-methyl-4-hydroxy-5-tert.butylphenyl)butane, and 1-[α-methyl-α-(3′,5-dimethyl-4′hydroxyphenyl)ethyl]-4-[α′,α′-bis(3″,5″-dimethyl-4″-hydroxyphenyl)ethyl]benzene.

The polyfunctional epoxy resin (A) is prepared from the trisphenol through any well-known reaction, for example, by etherifying it with an epihalohydrin or β-methylepihalohydrin, preferably epichlorohydrin or β-methylepichlorohydrin in the presence of an etherifying catalyst, followed by dehydrohalogenation. The polyfunctional epoxy resin (A) used herein is generally semi-solid or solid at room temperature, and has a softening point of up to 130° C., preferably up to 80° C., and an epoxy equivalent of 154 to 380, preferably 190 to 230. It preferably has a hydrolyzable chlorine content of up to 0.03% by weight.

The bisphenol epoxy resin (B) used herein is derived from a bisphenol such as bisphenol A, bisphenol B, bisphenol F, and 1,1-bis(4-hydroxyphenyl)ethane and an epihalohydrin or β-methylepihalohydrin, preferably epichlorohydrin or β-methylepichlorohydrin. Preferred are difunctional epoxy resins including bisphenol A epoxy resins, bisphenol F epoxy resins, and 1,1-bis(4-hydroxyphenyl)ethane epoxy resins. Resin (B) preferably has an epoxy equivalent of 150 to 300, more preferably 150 to 250, most preferably 160 to 210.

The highly halogenated bisphenol epoxy resin (D) is derived from a halogenated bisphenol, for example, brominated phenols, especially tetrabromobisphenol A, tetrabromobisphenol B, tetrabromobisphenol F, and 1,1-bis(3,5-dibromo-4-hydroxyphenyl)ethane, with an epihalohydrin or β-methylepihalohydrin, preferably epichlorohydrin or β-methyl-epichlorohydrin. The halogenated bisphenols used herein are preferably brominated phenols, especially tetrabromobisphenol A, tetrabromobisphenol F, and 1,1-bis(3,5-dibromo-4-hydroxyphenyl)ethane. It is prepared by etherifying the reactants in the presence of a conventional etherifying catalyst followed by dehydrohalogenation. Preferred are tetrabromobisphenol A epoxy resins, tetrabromobisphenol F epoxy resins, and 1,1-bis(3,5-dibromo-4-hydroxyphenyl)ethane epoxy resins. They preferably have an epoxy equivalent of 300 to 600, especially 300 to 400 and a bromine content of 45 to 54% by weight, especially 47 to 50% by weight.

In order to provide the end resin, that is, heat-resistant, flame-retardant, low viscosity resin desired in the present invention, epoxy resin composition (I) should preferably contain 10 to 80%, more preferably 30 to 70% by weight of polyfunctional epoxy resin (A) based on the weight of the composition.

Also, epoxy resin composition (I) should preferably have a halogen, more preferably bromine, content of 5 to 30%, more preferably 15 to 25% by weight.

The epoxy resin composition (I) of the invention may be prepared by any desired method capable of uniformly mixing the above-mentioned components. The necessary components may be mixed in a molten state or as a solution in a suitable solvent such as methyl ethyl ketone, acetone, dioxane, toluene, and xylene. The order of addition of the components during mixing is not critical. Either sequential or simultaneous mixing is acceptable.

The epoxy resin composition (I) of the invention may contain any of well-known other epoxy resins, if desired, insofar as they are not detrimental to the objects of the invention. Such additional resins include phenol novolak epoxy resins and ortho-cresol novolak epoxy resins. On use, the epoxy resin composition (I) is blended with a curing agent selected from well-known conventional epoxy resin curing agents, for example, aliphatic amines, aromatic amines, amine adducts, dicyandiamide, phenol novolak resins, ortho-cresol novolak resins, and acid anhydrides. The epoxy resin composition having a curing agent blended therein is ready for the preparation of electrically insulating coating materials, molding materials, encapsulants, and laminates.

The amount of curing agent used varies with the type of curing agent, but may be determined based on the ratio of epoxy equivalent to active hydrogen equivalent if the curing agent is a polyamine, for example. A curing accelerator may also be used if desired.

A coating composition may be prepared from the epoxy resin composition by blending therein a conventional coloring agent (pigment), filler, solvent, defoaming agent and other necessary agents. For the preparation of a molding composition or encapsulant, various fillers may be used. When it is desired to manufacture luminates from the epoxy resin composition, a varnish is first prepared by diluting the epoxy resin composition with a solvent, for example, an aromatic hydrocarbon such as toluene and xylene and a ketone such as acetone, methyl ethyl ketone, and methyl isobutyl ketone. A reinforcement, for example, glass cloth, carbon fibers, glass fibers, paper, asbestos, polyester fibers, aromatic polyamide fibers (trademark, Kevler) is impregnated with the varnish to form a prepreg, from which a laminate is molded by pressing under heat and pressure.

According to a second aspect of the present invention, there is provided a heat-resistant, flame-retardant epoxy resin composition (II) comprising a halogen-containing epoxy resin which is obtained by reacting a mixture comprising (A) a polyfunctional epoxy resin obtained by condensing a trisphenol of general formula [1]:

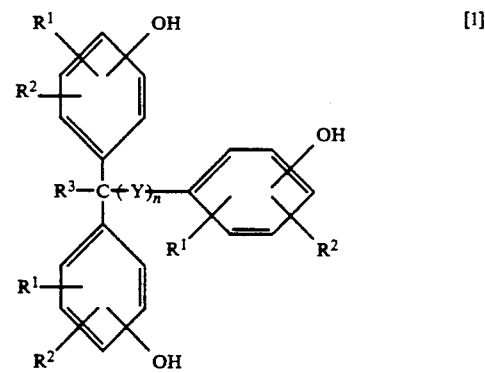

wherein $R^1$, $R^2$, and $R^3$ are independently selected from the class consisting of a hydrogen atom and an alkyl group having up to 4 carbon atoms, letter n is a number equal to 0 or 1, and Y is a group of general formula [1b] or [1c]:

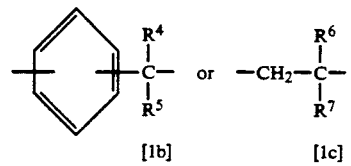

wherein $R^4$, $R^5$, $R^6$, and $R^7$ are independently selected from the class consisting of a hydrogen atom and an alkyl group having up to 4 carbon atoms, with an epihalohydrin or β-methylepihalohydrin, (B) a bisphenol epoxy resin obtained by condensing a bisphenol with an epihalohydrin or β-methylepihalohydrin, and (D) a highly halogenated bisphenol epoxy resin obtained by condensing a halogenated bisphenol with an epihalohydrin or β-methylepihalohydrin, with (C) a halogenated bisphenol in the presence of a catalyst.

Preferably, the epoxy resin composition (II) is composed of the halogen-containing epoxy resin having an epoxy equivalent of 300 to 1,000, more preferably 300 to 600. Preferably the halogen-containing epoxy resin has a halogen content of 5 to 30%, more preferably 15 to 20% by weight.

The epoxy resin composition (II) according to the second aspect of the invention is obtained by reacting a mixture comprising (A) a polyfunctional epoxy resin derived from a triphenol of formula [1], (B) a bisphenol epoxy resin derived from a bisphenol, and (D) a highly halogenated bisphenol epoxy resin derived from a halogenated bisphenol with (C) a halogenated bisphenol.

Among the components of epoxy resin composition (II), the polyfunctional epoxy resin (A), bisphenol epoxy resin (B), and highly halogenated bisphenol epoxy resin (D) have been described in connection with composition (I) of the first aspect.

The halogenated bisphenols (C) used herein are preferably brominated phenols, especially tetrabromobisphenol A, tetrabromobisphenol B, tetrabromobisphenol F, and 1,1-bis(3,5-dibromo-4-hydroxyphenyl)ethane.

The reaction of a mixture of a polyfunctional epoxy resin, a bisphenol epoxy resin (B), and a highly halogenated bisphenol epoxy resin (D) with a halogenated bisphenol (C) may be effected in the presence of a catalyst in a solventless system or in the presence of a solvent if desired. The solvent may be an aromatic hydrocarbon such as toluene and xylene and a ketone such as methyl isobutyl ketone.

The catalyst may be any well-known catalysts commonly used in the polyaddition reaction between an epoxy group and a phenolic hydroxyl group. Examples of the catalyst include basic catalysts such as sodium hydroxide and sodium carbonate; quaternary ammonium salt catalysts such as tetraalkyl ammonium halides and aralkyltrialkyl ammonium halides; and phosphorus catalysts such as triphenyl phosphine and ethyltriphenyl phosphonium halides. The catalyst is preferably used in an amount of about 10 to about 400 parts by weight per million parts (ppm) of the epoxy resin mixture.

The reaction may be effected at a temperature of about 120° C. to about 200° C. and atmospheric pressure for about 3 to about 20 hours, with stirring in a molten or solution state.

If a larger amount of halogenated phenol (C) is used in the reaction, there is formed an epoxy resin having a higher molecular weight and a higher viscosity. In turn, if larger amounts of bisphenol epoxy resin (B) and highly halogenated bisphenol epoxy resin (D) are used, there is formed an epoxy resin having a lower viscosity, which cures into a product having a lower glass transition temperature. For these reasons, polyfunctional epoxy resin (A), bisphenol epoxy resin (B), and highly halogenated bisphenol epoxy resin (D) are preferably used in a weight ratio in the range of from 100:100:70 to 100:20:5, more preferably from 100:80:50 to 100:50:10.

The proportion of the mixture and the halogenated bisphenol (C) used in the above-mentioned reaction may be suitably chosen depending on the desired halogen content in the resulting epoxy resin composition (II). In general, the mixing proportion is chosen such that the reaction product or epoxy resin composition (II) of the invention may have a halogen content of 5 to 30% by weight, preferably 10 to 25% by weight, more preferably 15 to 20% by weight. It is generally desired for the objects of the invention that the final epoxy resin composition (II) have an epoxy equivalent of 300 to 1,000, especially 300 to 600.

The epoxy resin composition (II) may contain any of well-known other epoxy resins, if desired, insofar as they are not detrimental to the objects of the invention. Such additional resins include bisphenol epoxy resins, low halogenated bisphenol epoxy resins (e.g., R-230, manufactured by Mitsui Petrochemical Industries, Ltd.), highly brominated epoxy resins (e.g., ETBA-100, manufactured by Nihon Kayaku K.K.), phenol novolak epoxy resins, and ortho-cresol novolak epoxy resins.

On use, the epoxy resin composition (II) may be combined with a curing agent and a curing accelerator as previously described for composition (I). Also, coating compositions and laminates may be obtained from epoxy resin composition (II) by the same procedures as previously described for composition (I).

According to a third aspect of the invention, there is provided a heat-resistant, flame-retardant epoxy resin composition (III) comprising (III-i) a halogen-containing epoxy resin which is obtained by reacting a mixture of (A) a polyfunctional epoxy resin obtained by condensing a triphenol of general formula [1]:

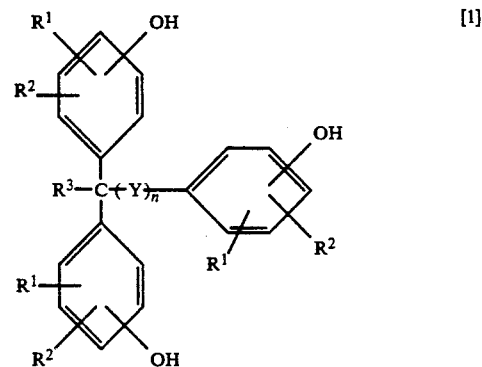

wherein $R^1$, $R^2$, and $R^3$ are independently selected from the class consisting of a hydrogen atom and an alkyl group having up to 4 carbon atoms, letter n is a number equal to 0 or 1, and Y is a group of general formula [1b] or [1c]:

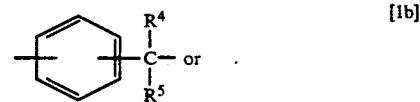

wherein $R^4$, $R^5$, $R^6$, and $R^7$ are independently selected from the class consisting of a hydrogen atom and an alkyl group having up to 4 carbon atoms, with an epihalohydrin or β-methylepihalohydrin, and (B) a bisphenol epoxy resin obtained by condensing a bisphenol with an epihalohydrin or β-methylepihalohydrin, with (C) a halogenated bisphenol in the presence of a catalyst, and (III-ii) at least one member selected from the group consisting of (B) a bisphenol epoxy resin obtained by condensing a bisphenol with an epihalohydrin or β-methylepihalohydrin, (D) a highly halogenated bisphenol epoxy resin obtained by condensing a halogenated bisphenol with an epihalohydrin or β-methylepihalohydrin, and (E) a low halogenated bisphenol epoxy resin obtained by reacting a bisphenol epoxy resin resulting from condensation between a bisphenol and an epihalohydrin or β-methylepihalohydrin with a halogenated bisphenol.

Preferably, the epoxy resin composition (III) has an epoxy equivalent of 200 to 700, more preferably 250 to 450 and a halogen content of 10 to 30%, more preferably 15 to 20% by weight.

The epoxy resin composition (III) according to the third aspect of the invention is a mixture of (III-i) a halogen-containing epoxy resin obtained by reacting a mixture comprising (A) a polyfunctional epoxy resin derived from a trisphenol of formula [1] and (B) a bisphenol epoxy resin derived from a bisphenol with (C) a halogenated bisphenol and (III-ii) at least one member selected from the group consisting of (B) a bisphenol epoxy resin, (D) a highly halogenated bisphenol epoxy resin derived from a halogenated bisphenol, and (E) a low halogenated bisphenol epoxy resin.

(III-i) The first component of epoxy resin composition (III) is obtained using the polyfunctional epoxy resin (A), bisphenol epoxy resin (B), and halogenated bisphenol (C), which are the same as previously described.

The reaction of a mixture of a polyfunctional epoxy resin (A) and a bisphenol epoxy resin (B) with a halogenated bisphenol (C) may be effected in the presence of a catalyst in a solventless system or in the presence of a solvent if desired. The solvent may be an aromatic hydrocarbon such as toluene and xylene and a ketone such as methyl isobutyl ketone.

The catalyst may be any well-known catalysts commonly used in the polyaddition reaction between an epoxy group and a phenolic hydroxyl group. Examples of the catalyst include basic catalysts such as sodium hydroxide and sodium carbonate; quaternary ammonium salt catalysts such as tetraalkyl ammonium halides and aralkyltrialkyl ammonium halides; and phosphorus catalysts such as triphenyl phosphine and ethyltriphenyl phosphonium halides. The catalyst is preferably used in an amount of about 10 to about 400 parts by weight per million parts (ppm) of the epoxy resin mixture.

The reaction may be effected at a temperature of about 120° C. to about 200° C. and atmospheric pressure for about 3 to about 20 hours, with stirring in a molten or solution state.

If a larger amount of halogenated phenol (C) is used in the reaction, there is formed an epoxy resin having a higher molecular weight and a higher viscosity. The proportion of reactants in the reaction between the above-mentioned mixture and the halogenated bisphenol (C) may be suitably chosen depending on the desired halogen content of the reaction product, that is, epoxy resin (III-i). For the purpose of the invention, a proper choice is made such that the halogen-containing epoxy resin (III-i) may have a halogen content of 5 to 30%, especially 6 to 20% by weight. In turn, if a larger amount of bisphenol epoxy resin (B) is used, there is formed an epoxy resin having a lower viscosity, which cures into a product having a lower glass transition temperature. For these reasons, polyfunctional epoxy resin (A) and bisphenol epoxy resin (B) are preferably used in a weight ratio in the range of from 90:10 to 20:80, more preferably from 80:20 to 50:50.

(III-ii) The second component of composition (III) is selected from (B) bisphenol epoxy resin, (D) highly halogenated bisphenol epoxy resin, and (E) low halogenated bisphenol epoxy resin, among which the former two are the same as previously described.

The low halogenated bisphenol epoxy resin (E) is obtained by reacting a bisphenol epoxy resin with a halogenated bisphenol in the presence of a catalyst. The epoxy resin (E) preferably has an epoxy equivalent of 250 to 600, especially 400 to 500 and a halogen content of 5 to 30% by weight, especially 15 to 25% by weight. The bisphenol epoxy resin used herein includes a bisphenol A epoxy resin, a bisphenol B epoxy resin, a bisphenol F epoxy resin, and a bisphenol epoxy resin resulting from condensation between a bisphenol such as 1,1-bis(glycidoxyphenyl)ethane and an epihalohydrin or β-methylepihalohydrin as previously defined for (B). The halogenated bisphenol used herein is as previously defined for (C). The reaction between a bisphenol epoxy resin and a halogenated bisphenol may be carried out in the same manner as described for the reaction of a mixture of polyfunctional epoxy resin (A) and bisphenol epoxy resin (B) with halogenated bisphenol (C) in connection with (III-i).

As described above, the heat-resistant, flame-retardant epoxy resin composition (III) according to the third aspect of the invention is comprised of (III-i) halogen-containing epoxy resin and (III-ii) at least one member selected from components (B), (D), and (E). In composition (III), its epoxy equivalent, solution viscosity, flame retardancy, and heat resistance (glass transition temperature) can be independently controlled by blending halogen-containing epoxy resin (III-i) with a properly selected one or more of components (B), (D), and (E).

The proportion of components (B), (D), and (E) is not particularly limited. In one preferred embodiment, 0 to 20 parts by weight of bisphenol epoxy resin (B) and 5 to 55 parts by weight of highly halogenated bisphenol epoxy resin (D) are used per 100 parts by weight of halogen-containing epoxy resin (III-i). In another preferred embodiment, 20 to 50 parts by weight of low halogenated 1 bisphenol epoxy resin (E) and 0 to 50 parts by weight of highly halogenated bisphenol epoxy resin (D) are used per 100 parts by weight of halogen-containing epoxy resin (III-i). In a further preferred embodiment, 0 to 20 parts by weight of bisphenol epoxy resin (B), 0 to 50 parts by weight of low halogenated bisphenol epoxy resin (E), and 0 to 170 parts by weight of highly halogenated bisphenol epoxy resin (D) are used per 100 parts by weight of halogen-containing epoxy resin (III-i).

The halogen-containing epoxy resin (III-i) may be blended with components (B), (D), and/or (E) by any well-known method, for example, in a solution state or in a molten state by heating. The order of addition of components (B), (D), and (E) is not critical.

The epoxy resin composition (III) obtained in this manner preferably has an epoxy equivalent of 200 to 700, more preferably 250 to 450 and a halogen content of 10 to 30%, more preferably 15 to 20% by weight.

The epoxy resin composition (III) of the invention may contain any of well-known other epoxy resins, if desired, insofar as they are not detrimental to the objects of the invention. Such additional resins include phenol novolak epoxy resins and ortho-cresol novolak epoxy resins.

On use, the epoxy resin composition (III) may be combined with a curing agent and a curing accelerator as previously described for composition (I). Also, coating compositions and laminates may be obtained from epoxy resin composition (III) by the same procedures as previously described for composition (I).

EXAMPLE

Examples of the invention are given below by way of illustration and not by way of limitation.

EXAMPLE 1

A 1-liter, four-necked glass flask equipped with a stirrer and a reflux condenser was charged with 462.5 grams of epichlorohydrin and 141.3 grams of 1-[α-methyl-α-(4'-hydroxyphenyl)ethyl]-4-[α',α'-bis(4"-hydroxyphenyl)ethyl]-benzene. With stirring, the temperature of the flask was raised to 70° C. At the temperature of 70° C. and under a vacuum of 300 mmHg, 79 grams of a 48% aqueous solution of sodium hydroxide was continuously added dropwise over 3 hours. During the process, water was continuously taken out of the glass flask. At the end of reaction, unreacted epichlorohydrin was stripped out of the glass flask. To the residue were added 230 grams of methyl isobutyl ketone and 230 grams of water. The mixture was stirred so that the resulting sodium chloride was transferred into the aqueous phase. The mixture was allowed to stand and the aqueous phase separated was removed. To the oil phase were added 10 grams of a 48% aqueous solution of sodium hydroxide. The mixture was stirred at 85° C. for a further two hours to effect a second dehydrochlorination reaction. Thereafter, the oil phase was separated from the aqueous phase and then subjected to neutralization by adding 76 grams of a 30% aqueous solution of sodium dihydrogen phosphate, removal of water by azeotropic distillation, and filtration of the salt through a G4 glass filter. After the methyl isobutyl ketone was completely removed from the oil phase at a vacuum of 5 mmHg and a temperature of 150° C., there was obtained a polyfunctional epoxy resin (A-1) having an epoxy equivalent of 209 and a softening point of 59° C.

To 335 grams of methyl ethyl ketone (MEK) were added 390 grams of polyfunctional epoxy resin (A-1), 214.2 grams of bisphenol epoxy resin (B-1) having an epoxy equivalent of 188, and 395.8 grams of a highly brominated bisphenol A epoxy resin (D-1) having an epoxy equivalent of 356 and a bromine content of 48.1% by weight (trademark ETBA-100 manufactured and sold by Nihon Kayaku K.K.). The mixture was heated and stirred until a solution was formed. This epoxy resin solution had an epoxy equivalent of 319 (g/eq), a solid content of 75.8% by weight, a bromine content of 14.1% by weight, and a viscosity of 50 centipoise at 25° C.

A varnish was prepared by mixing 100 parts by weight (calculated as solids) of the epoxy resin solution, 15 parts by weight of ethylene glycol monomethyl ether, 15 parts by weight of dimethylformamide, an amount of dicyandiamide to provide an active hydrogen group/epoxy group ratio of 0.65/1, and 0.2 parts by weight of 2-ethyl-4-methylimidazole.

Glass cloth (WE-18K-BZ2, manufactured by Nitto Boseki K.K.) was impregnated with the varnish, which was half cured by heating at 150° C. for 5 minutes, obtaining a prepreg. A glass cloth laminate was molded by pressing a stack of nine sheets of the prepreg at 180° C. and 10 kgf/cm² for 60 minutes. The molded laminate had a glass transition temperature (Tg) of 187° C. as measured by a differential scanning calorimeter and a flame retardancy rating of V-0 in the UL94 test.

The results are shown in Table 1.

EXAMPLE

Glass cloth laminates were prepared by repeating the procedure of Example 1 except that the components were used in the amounts reported in Table 1. The same measurements as in Example 1 were carried out, with the results shown in Table 1.

TABLE 1

|  | Example 1 | Example 2 |
| --- | --- | --- |
| Component (grams) |  |  |
| A-1 | 390 | 500 |
| D-1 | 395.8 | 395.8 |
| B-1 | 214.2 | 104.2 |
| MEK | 335 | 335 |
| Resin composition |  |  |
| Solids, wt % | 75.8 | 75.1 |
| Epoxy equivalent, g/eq | 319 | 330 |
| Viscosity, cps/25° C. | 50 | 60 |
| Br content, wt % | 14.1 | 14.3 |
| Laminate |  |  |
| Tg, °C./pcs | 187 | 192 |
| Flame retardancy, UL94 | V-0 | V-0 |

(Note)
A-1: polyfunctional epoxy resin described in Example 1
D-1: tetrabromobisphenol A epoxy resin (ETBA-100, Nihon Kayaku K.K.)
B-1: bisphenol epoxy resin
MEK: methyl ethyl ketone

EXAMPLE 3

A 1-liter, four-necked glass flask equipped with a stirrer and a reflux condenser was charged with 462.5 grams of epichlorohydrin and 141.3 grams of 1-[α-methyl-α-(4'-hydroxyphenyl)ethyl]-4-[α',α'-bis(4"-hydroxyphenyl)ethyl]-benzene. With stirring, the temperature of the flask was raised to 70° C. At the temperature of 70° C. and under a vacuum of 300 mmHg, 79 grams of a 48% aqueous solution of sodium hydroxide was continuously added dropwise over 3 hours. During the process, water was continuously taken out of the glass flask. At the end of reaction, unreacted epichlorohydrin was stripped out of the glass flask. To the residue were added 230 grams of methyl isobutyl ketone and 230 grams of water. The mixture was stirred so that the resulting sodium chloride was transferred into the aqueous phase. The mixture was allowed to stand and the aqueous phase separated was removed. To the oil phase were added 10 grams of a 48% aqueous solution of sodium hydroxide. The mixture was stirred at 85° C. for a further two hours to effect a second dehydrochlorination reaction. Thereafter, the oil phase was separated from the aqueous phase and then subjected to neutralization by adding 76 grams of a 30% aqueous solution of sodium dihydrogen phosphate, removal of water by azeotropic distillation, and filtration of the salt through a G4 glass filter. After the methyl isobutyl ketone was completely removed from the oil phase at a vacuum of 5 mmHg and a temperature of 150° C., there was obtained a polyfunctional epoxy resin (A-2) having an epoxy equivalent of 212 and a softening point of 60° C.

A 1-liter separable flask was charged with 213 grams of polyfunctional epoxy resin (A-2), 114 grams of bisphenol A epoxy resin (B-1) having an epoxy equivalent of 188, 47 grams of a highly brominated bisphenol A epoxy resin (D-1) having an epoxy equivalent of 356 (trademark ETBA-100 manufactured and sold by Nihon Kayaku K.K.), 124 grams of tetrabrominated bisphenol A (C-1), and 50 grams of xylene. To the flask was added 0.2 ml of a 10 wt% aqueous solution of tetramethyl ammonium chloride. The solution was heated under a nitrogen gas atmosphere with stirring. Vacuum was applied to the glass flask when a temperature of 130° C. was reached. The glass flask was further heated up to 140° C. while xylene and water were removed.

The glass flask was resumed to atmospheric pressure and heating at 150° C. was continued for 6 hours in a nitrogen atmosphere. After the temperature was lowered to 75° C., 170 grams of methyl ethyl ketone was added to dissolve the glass flask. There was obtained a methyl ethyl ketone solution of an epoxy resin having an epoxy equivalent of 510 (382 in solid form), a bromine content of 14.1% by weight (19.1% by weight in solid form), a viscosity of 690 centipoise at 25° C., and a solid content of 74.8% by weight.

A varnish was prepared by mixing 100 parts by weight (calculated as solids) of this methyl ethyl ketone solution of epoxy resin, 15 parts by weight of ethylene glycol monomethyl ether, 15 parts by weight of dimethylformamide, an amount of dicyandiamide to provide an active hydrogen group/epoxy group ratio of 0.65/1, and 0.2 parts by weight of 2-ethyl-4-methylimidazole.

Glass cloth (WE-18K-BZ2, manufactured by Nitto Boseki K.K.) was impregnated with the varnish, which was half cured by heating at 150° C. for 5 minutes, obtaining a prepreg. A glass cloth laminate was molded by pressing a stack of nine sheets of the prepreg at 180° C. and 10 kgf/cm² for 60 minutes. The molded laminate had a glass transition temperature (Tg) of 190° C. and a flame retardancy rating of V-0 in the UL94 test.

The laminate was examined for bubble entrainment by observing it under a microscope with a magnifying power of X40. The laminate sample was evaluated "O" when it contained less bubbles at the same level as FR⁴ resin, "Δ" when it contained somewhat more bubbles than the FR⁴ level, and "X" when the laminate fogged white.

The results are shown in Table 2.

EXAMPLES 4–6

Glass cloth laminates were prepared by repeating the procedure of Example 3 except that the components were used in the amounts reported in Table 2. The same measurements as in Example 3 were carried out, with the results shown in Table 2.

COMPARATIVE EXAMPLES 1-2

Glass cloth laminates were prepared by repeating the procedure of Example 3 except that Comparative Example 1 omitted (D) the highly brominated bisphenol A epoxy resin (ETBA-100) and Comparative Example 2 omitted (B) the bisphenol A epoxy resin and (D) the highly brominated bisphenol A epoxy resin (ETBA-100). The same measurements as in Example 3 were carried out, with the results shown in Table 2.

TABLE 2

|  | E3 | E4 | E5 | E6 | CE1 | CE2 |
| --- | --- | --- | --- | --- | --- | --- |
| Component (grams) | | | | | | |
| A-1 | 140 | 390 | 390 | 425 | 390 | 400 |
| B-1 | 91 | 267 | 278 | 233 | 285 | — |
| D-1 | 59 | 104 | 42 | 94 | — | — |
| C-1 | 69 | 239 | 291 | 248 | 325 | 176 |
| MEK | 120 | 335 | 335 | 335 | 335 | 195 |
| Resin composition | | | | | | |
| Solids, wt % | 74.8 | 74.3 | 74.3 | 74.8 | 75.2 | 75.2 |
| Epoxy equivalent, g/eq. | 456 | 498 | 575 | 510 | 615 | 646 |
| Viscosity, cps/25° C. | 308 | 430 | 1075 | 690 | 1740 | 1900 |
| Br content, wt % | 13.9 | 14.3 | 14.1 | 14.0 | 14.1 | 13.5 |
| Laminate | | | | | | |
| Bubble entrainment | O | O | Δ | O | × | × |
| Tg, °C./pcs | 192 | 180 | 180 | 190 | 170 | 188 |
| Flame retardancy, UL94 | V-0 | V-0 | V-0 | V-0 | V-0 | V-0 |

(Note)
A-2: polyfunctional epoxy resin described in Example 3
B-1: bisphenol A epoxy resin
D-1: highly brominated bisphenol A epoxy resin (ETBA-100, Nihon Kayaku K.K.)
C-1: tetrabromobisphenol A with a Br content of 58.5 wt %
MEK: methyl ethyl ketone

EXAMPLE 7

A 1-liter separable flask was charged with 1500 grams of polyfunctional epoxy resin (A-1) derived from 1-[α-methyl-α-(4′-hydroxyphenyl)ethyl]-4-[α′,α′-bis(4″-hydroxyphenyl)-ethyl]benzene and having an epoxy equivalent of 209, 100 grams of bisphenol A epoxy resin (B-1) having an epoxy equivalent of 188, 944 grams of a tetrabromobisphenol A (C-1), and 300 grams of xylene. To the flask was added 1.4 ml of a 10 wt % aqueous solution of tetramethyl ammonium chloride. The solution was heated under a nitrogen gas atmosphere with stirring. Vacuum was applied to the glass flask when a temperature of 130° C. was reached. The glass flask was further heated up to 140° C. while xylene and water were removed. The glass flask was resumed to atmospheric pressure and heating at 150° C. was continued for 6 hours in a nitrogen atmosphere.

While the reaction system was allowed to cool down, 347 grams of highly brominated bisphenol A epoxy resin (D-1) having an epoxy equivalent of 356 (trademark ETBA-100 manufactured and sold by Nihon Kayaku K.K.) was added. When the temperature reached 75° C., 1264 grams of methyl ethyl ketone was added to dissolve the glass flask. There was obtained a methyl ethyl ketone solution of an epoxy resin having an epoxy equivalent of 513 (387 in solid form), a bromine content of 14.3% by weight (190.0% by weight in solid form), a viscosity of 710 centipoise at 25° C., and a solid content of 75.4% by weight.

A varnish was prepared by mixing 100 parts by weight (calculated as solids) of the epoxy resin solution, 15 parts by weight of ethylene glycol monomethyl ether, 15 parts by weight of dimethylformamide, an amount of dicyandiamide to provide an active hydrogen group/epoxy group ratio of 0.65/1, and 0.2 parts by weight of 2-ethyl-4-methylimidazole.

Glass cloth (WE-18K-BZ2, manufactured by Nitto Boseki K.K.) was impregnated with the varnish, which was half cured by heating at 150° C. for 5 minutes, obtaining a prepreg. A glass cloth laminate was molded by pressing a stack of nine sheets of the prepreg at 180° C. and 10 kgf/cm$^2$ for 60 minutes. The molded laminate had a glass transition temperature (Tg) of 189° C. as measured by a differential scanning calorimeter and a flame retardancy rating of V-0 in the UL94 test.

The results are shown in Table 3.

EXAMPLES 8–15

Glass cloth laminates were prepared by repeating the procedure of Example 7 except that the components were used in the amounts reported in Table 3. The same measurements as in Example 7 were carried out, with the results shown in Table 3. As a low brominated epoxy resin, a resin (E) having an epoxy equivalent of 487 and a bromine content of 21.1% by weight was used. The low brominated epoxy resin (E) was obtained by reacting a bisphenol A epoxy resin with a brominated bisphenol.

COMPARATIVE EXAMPLES 3–4

Glass cloth laminates were prepared by repeating the procedure of Example 7 except that the type and amount of components were changed as reported in Table 3. The same measurements as in Example 7 were carried out, with the results shown in Table 3.

and (D) a highly halogenated bisphenol epoxy resin with (C) a halogenated bisphenol, is easier to work and process and cures into a cured product having more satisfactory heat resistance and flame retardancy than the prior art well-known heat-resistant, flame-retardant epoxy resins as is evident from Examples and Comparative Examples.

The epoxy resin composition (II) is effective for impregnating reinforcements such as glass cloth therewith. The cured product in stacked and molded form provides a laminate which has both heat resistance and flame retardancy and is well reliable at high temperatures, thus especially suitable as electronic parts.

Although the epoxy resin composition (II) contains a major proportion of a polyfunctional epoxy resin derived from a trisphenol, it has a substantially linear, gel free structure as demonstrated by its full solubility in organic solvents such as methyl ethyl ketone. It has the benefit of ease of working and processing when used in a variety of applications.

The epoxy resin composition (III) according to the third aspect of the invention is a composition comprising (III-i) a halogen-containing epoxy resin obtained by reacting a mixture comprising (A) a polyfunctional epoxy resin derived from a specific trisphenol and an epihalohydrin and (B) a bisphenol epoxy resin derived from a bisphenol and an epihalohydrin with (C) a halogenated bisphenol in the presence of a catalyst, and (III-ii) at least one member selected from the group consisting of (B) a bisphenol epoxy resin, (D) a highly halogenated bisphenol epoxy resin, and (E) a low halo-

TABLE 3

|  | E7 | E8 | E9 | E10 | E11 | E12 | E13 | CE3 | CE4 | E14 | E15 |
| --- | --- | --- | --- | --- | --- | --- | --- | --- | --- | --- | --- |
| Component (grams) | | | | | | | | | | | |
| Preliminary reaction | | | | | | | | | | | |
| A-1 | 1500 | 1500 | 332 | 332 | 3208 | 2130 | 332 | 400 | 390 | 332 | 120 |
| B-1 | 1000 | 1000 | 142 | 142 | 1375 | 913 | 142 | — | 285 | 142 | 30 |
| C-1 | 944 | 935 | 179 | 179 | 1580 | 479 | 179 | 176 | 325 | 179 | 61 |
| Post addition/mixing | | | | | | | | | | | |
| B-1 | — | 421 | — | 80 | 779 | 539 | — | — | — | 33 | — |
| D-1 | 347 | 629 | 67 | 120 | 1353 | 1683 | 67 | — | — | 83 | — |
| E | — | — | — | — | — | — | 127 | — | — | 90 | 68 |
| MEK | 1264 | 1354 | 240 | 284 | 2765 | 1915 | 290 | 192 | 335 | 290 | 93 |
| Resin composition | | | | | | | | | | | |
| Solids, wt % | 75.4 | 75.9 | 74.8 | 75.5 | 75.5 | 75.5 | 75.3 | 75.2 | 75.2 | 74.9 | 75.2 |
| Epoxy equivalent, g/eq. | 513 | 459 | 519 | 469 | 457 | 364 | 536 | 646 | 615 | 511 | 586 |
| Viscosity, cps/25° C. | 710 | 500 | 910 | 500 | 350 | 110 | 880 | 1900 | 1740 | 400 | 1200 |
| Br content, wt % | 14.3 | 14.2 | 14.2 | 14.2 | 14.5 | 14.2 | 14.1 | 13.5 | 14.1 | 14.2 | 13.6 |
| Laminate | | | | | | | | | | | |
| Tg, °C./pcs | 189 | 181 | 190 | 190 | 187 | 191 | 182 | 188 | 170 | 186 | 179 |
| Flame retardancy, UL94 | V-0 | V-0 | V-0 | V-0 | V-0 | V-0 | V-0 | V-0 | V-0 | V-0 | V-0 |

(Note)
A-1: polyfunctional epoxy resin with an epoxy equivalent of 209
B-1: bisphenol A epoxy resin
C-1: tetrabromobisphenol A with a Br content of 58.5 wt %
D-1: highly brominated bisphenol A epoxy resin with a Br content of 48.1 wt % (ETBA-100, Nihon Kayaku K.K.)
E: low brominated bisphenol A epoxy resin with an epoxy equivalent of 487 and a Br content of 21.1 wt %
MEK: methyl ethyl ketone The epoxy resin composition (I) comprising a polyfunctional epoxy resin (A) derived from a specific trisphenol, a highly halogenated bisphenol epoxy resin (D), and a bisphenol epoxy resin (B) according to the first form of the invention provides a low viscosity resin which cures into a cured product having high heat resistance and experiences little loss of mechanical properties and electrical insulation on use as elevated temperature.

The heat-resistant, flame-retardant epoxy resin composition (II), which is obtained by reacting a mixture comprising (A) a polyfunctional epoxy resin derived from a specific trisphenol, (B) a bisphenol epoxy resin, genated bisphenol epoxy resin. There is available a relatively low molecular weight epoxy resin because all the halogen content necessary to impart flame retardancy need not be provided by only the halogenated bisphenols.

The epoxy resin composition (III) comprising a major amount of a polyfunctional epoxy resin (A) derived from a specific trisphenol and a difunctional epoxy resin added thereto can exhibit satisfactory heat resistance when an optimum amount of the polyfunctional epoxy resin (A) is used.

The epoxy resin composition (III) is easier to work and process and cures into a cured product having more satisfactory heat resistance and flame retardancy than the prior art well-known heat-resistant, flame-retardant epoxy resins as is evident from Examples and Comparative Examples.

The epoxy resin composition (III) is effective for impregnating reinforcements such as glass cloth therewith. The cured product in stacked and molded form provides a laminate which has both heat resistance and flame retardancy and is well reliable at high temperatures, thus especially suitable as electronic parts.

Although the epoxy resin composition (III) contains a major proportion of a polyfunctional epoxy resin (A) derived from a trisphenol, it has a substantially linear, gel-free structure as demonstrated by its full solubility in organic solvents such as methyl ethyl ketone. It has the benefit of ease of working and processing when used in a variety of applications.

Although some preferred embodiments have been described, many modifications and variations may be made thereto in the light of the above teachings. It is therefore to be understood that within the scope of the appended claims, the invention may be practiced otherwise than as specifically described.

We claim:

1. A heat-resistant, flame-retardant epoxy resin composition comprising (A) a polyfunctional epoxy resin obtained by condensing a trisphenol of general formula [1]:

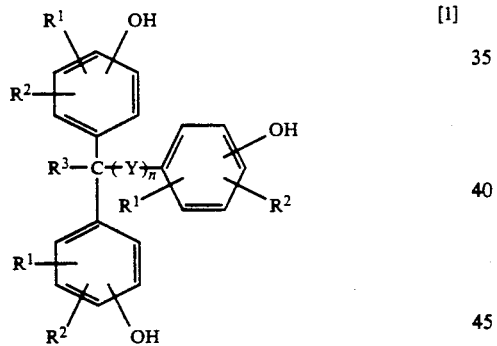

wherein $R^1$, $R^2$, and $R^3$ are independently selected from the group consisting of a hydrogen atom and an alkyl group having up to 4 carbon atoms, letter n is a number equal to 0 or 1, and Y is a group of general formula [1b] or [1c]:

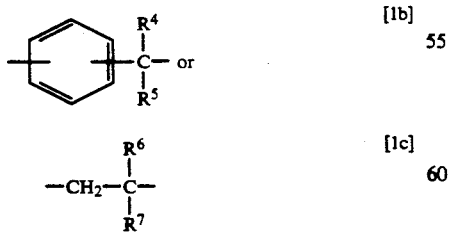

wherein $R^4$, $R^5$, $R^6$, and $R^7$ are independently selected from the group consisting of a hydrogen atom and an alkyl group having up to 4 carbon atoms, with an epihalohydrin or β-methylepihalohydrin, (B) a bisphenol epoxy resin obtained by condensing a bisphenol with an epihalohydrin or β-methylepihalohydrin, and (D) a highly halogenated bisphenol epoxy resin having a halogen content of 45 to 54% by weight obtained by condensing a halogenated bisphenol with an epihalohydrin or β-methylepihalohydrin.

2. The heat-resistant, flame-retardant epoxy resin composition of claim 1 which contains 10 to 80% by weight of the composition of said polyfunctional epoxy resin (A).

3. The heat-resistant, flame-retardant epoxy resin composition of claim 1 which has a halogen content of 5 to 30% by weight.

4. A heat-resistant, flame-retardant epoxy resin composition comprising a halogen-containing epoxy resin which is obtained by reacting a mixture comprising (A) a polyfunctional epoxy resin obtained by condensing a trisphenol of general formula [1]:

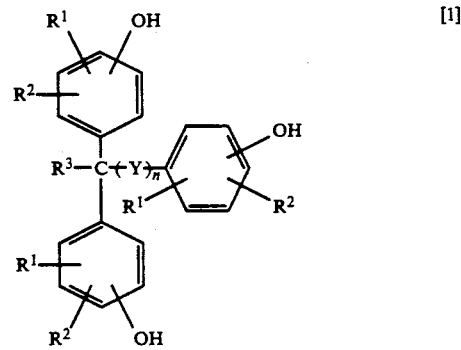

wherein $R^1$, $R^2$, and $R^3$ are independently selected from the group consisting of a hydrogen atom and an alkyl group having up to 4 carbon atoms, letter n is a number equal to 0 or 1, and Y is a group of general formula [1b] or [1c]:

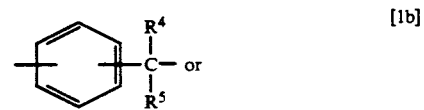

wherein $R^4$, $R^5$, $R^6$, and $R^7$ are independently selected from the group consisting of a hydrogen atom and an alkyl group having up to 4 carbon atoms, with an epihalohydrin or β-methylepihalohydrin, (B) a bisphenol epoxy resin obtained by condensing a bisphenol with an epihalohydrin or β-methylepihalohydrin, and (D) a highly halogenated bisphenol epoxy resin having a halogen content of 45 to 54% by weight obtained by condensing a halogenated bisphenol with an epihalohydrin or β-methylepihalohydrin, with (C) a halogenated bisphenol in the presence of a catalyst.

5. The heat-resistant, flame-retardant epoxy resin composition of claim 4 wherein said halogen-containing epoxy resin has an epoxy equivalent of 300 to 1,000.

6. The heat-resistant, flame-retardant epoxy resin composition of claim 4 wherein said halogen-containing epoxy resin has a halogen content of 5 to 30% by weight.

7. The heat-resistant, flame-retardant epoxy resin composition of claim 1 or 4 wherein said halogenated bisphenol is selected from the group consisting of tetrabromobisphenol A, tetrabromobisphenol B, tetrabromobisphenol F, and 1,1-bis(3,5-dibromo-4-hydroxyphenyl)ethane.

8. The heat-resistant, flame-retardant epoxy resin composition of claim 1 or 4 wherein said trisphenol compound is selected from the group consisting of 1-[α-methyl-α-(4'-hydroxyphenyl)ethyl]-4-[α',α'-bis(4''-hydroxyphenyl)ethyl]benzene, 1-[α-methyl-α-(3',5'-dimethyl-4'-hydroxyphenyl)ethyl]- 4-[α',α'-bis(3'',5''-dimethyl-4''-hydroxyphenyl)ethyl]-benzene, and 1,1,3-tris(2-methyl-4-hydroxy-5-tert.butyl-phenyl)butane.

9. The heat-resistant, flame-retardant epoxy resin composition of claim 1 or 4 wherein said bisphenol is selected from the group consisting of bisphenol A, bisphenol B, bisphenol F, and 1,1-bis(4-hydroxyphenyl)ethane.

10. The heat-resistant, flame-retardant epoxy resin composition of claim 1 or 4 wherein said polyfunctional epoxy resin (A), said bisphenol epoxy resin (B), and said highly halogenated bisphenol epoxy resin (D) are present in a weight ratio in the range of from 100:80:50 to 100:20:5.

11. A heat-resistant, flame-retardant epoxy resin composition comprising
a halogen-containing epoxy resin which is obtained by reacting a mixture of (A) a polyfunctional epoxy resin obtained by condensing a trisphenol of general formula [1]:

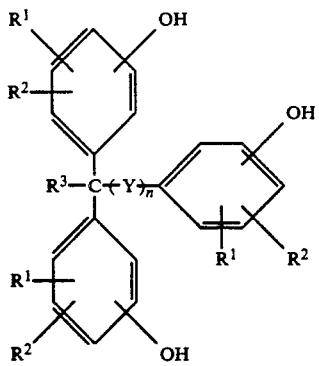

wherein $R^1$, $R^2$, and $R^3$ are independently selected from the group consisting of a hydrogen atom and an alkyl group having up to 4 carbon atoms, letter n is a number equal to 0 or 1, and Y is a group of general formula [1b] or [1c]:

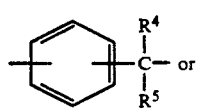

$$-CH_2-\underset{\underset{R^7}{|}}{\overset{\overset{R^6}{|}}{C}}- \quad [1c]$$

wherein $R^4$, $R^5$, $R^6$, and $R^7$ are independently selected from the group consisting of a hydrogen atom and an alkyl group having up to 4 carbon atoms, with an epihalohydrin or β-methylepihalohydrin, and (B) a bisphenol epoxy resin obtained by condensing a bisphenol with an epihalohydrin or β-methylepihalohydrin, with (C) a halogenated bisphenol in the presence of a catalyst, and
at least one member selected from the group consisting of (B) a bisphenol epoxy resin obtained by condensing a bisphenol with an epihalohydrin or β-methylepihalohydrin, (D) a highly halogenated bisphenol epoxy resin having a halogen content of 45 to 54% by weight obtained by condensing a halogenated bisphenol with an epihalohydrin or β-methylepihalohydrin, and (E) a low halogenated bisphenol epoxy resin having a halogen content of 5 to 30% by weight obtained by reacting a bisphenol epoxy resin resulting from condensation between a bisphenol and an epihalohydrin or β-methylepihalohydrin with a halogenated bisphenol.

12. The heat-resistant, flame-retardant epoxy resin composition of claim 11 wherein said halogen-containing epoxy resin has an epoxy equivalent of 300 to 1,000 and a halogen content of 5 to 30% by weight.

13. The heat-resistant, flame-retardant epoxy resin composition of claim 11 wherein said halogen-containing epoxy resin contains said polyfunctional epoxy resin (A) and said bisphenol epoxy resin (B) in a weight ratio of from 90:10 to 20:80.

14. The heat-resistant, flame-retardant epoxy resin composition of claim 11 which contains
100 parts by weight of said halogen-containing epoxy resin,
0 to 20 parts by weight of said bisphenol epoxy resin (B), and
5 to 55 parts by weight of said highly halogenated bisphenol epoxy resin (D).

15. The heat-resistant, flame-retardant epoxy resin composition of claim 11 which has an epoxy equivalent of 200 to 700 and a halogen content of 10 to 30% by weight.

16. The heat-resistant, flame-retardant epoxy resin composition of claim 11 wherein said halogenated bisphenol is selected from the group consisting of tetrabromobisphenol A, tetrabromobisphenol B, tetrabromobisphenol F, and 1,1-bis(3,5-dibromo-4-hydroxyphenyl)ethane.

17. The heat-resistant, flame-retardant epoxy resin composition of claim 11 wherein said trisphenol compound is selected from the group consisting of 1-[α-methyl-α-(4'-hydroxyphenyl)ethyl]-4-[α',α'-bis(4''-hydroxyphenyl)ethyl]benzene, 1-[α-methyl-α-(3',5'-dimethyl-4'-hydroxyphenyl) ethyl]-4-[α',α'-bis(3'',5''-dimethyl-4''-hydroxyphenyl)ethyl]benzene, and 1,1,3-tris(2-methyl-4-hydroxy-5-tert.butyl-phenyl)butane.

18. The heat-resistant, flame-retardant epoxy resin composition of claim 11 wherein said bisphenol is selected from the group consisting of bisphenol A, bisphenol B, bisphenol F, and 1,1-bis(4-hydroxyphenyl)ethane.

* * * * *